Figure 1:
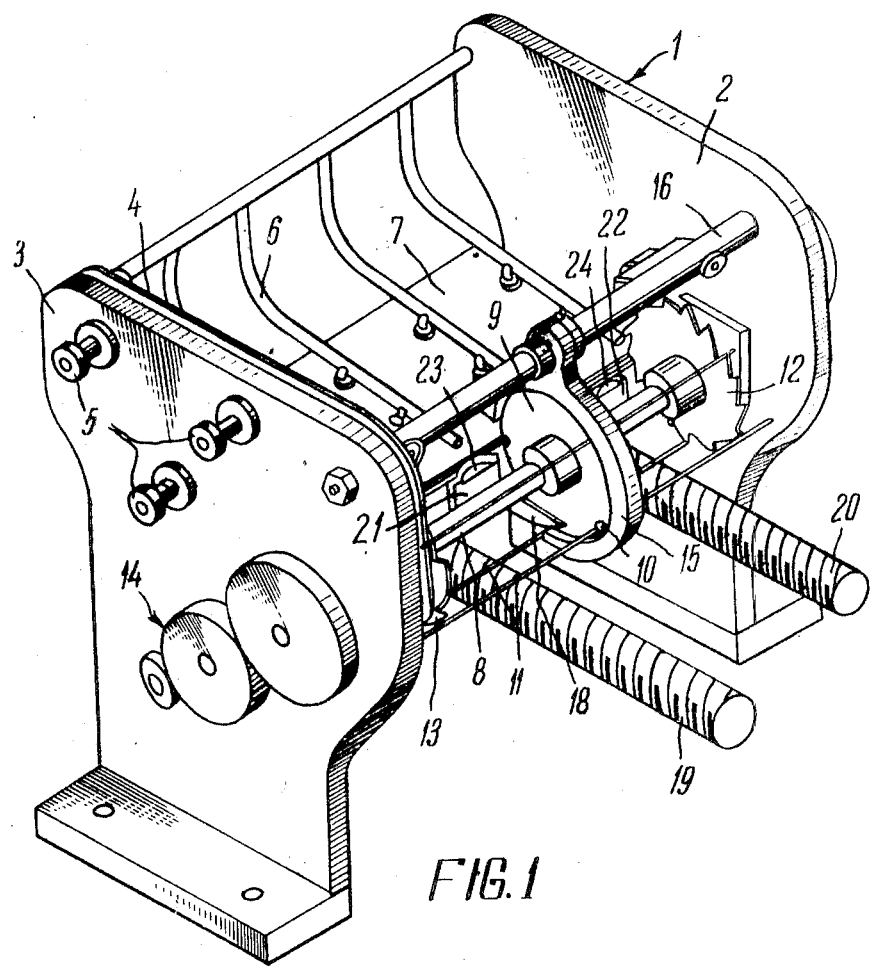

United States Patent

[11] 3,596,551

[72] Inventor Konstantin Lukich Lyamets
    ulitsa Iskorovskaya, 1, kv.36, Kiev, U.S.S.R.
[21] Appl. No. 873,854
[22] Filed Nov. 4, 1969
[45] Patented Aug. 3, 1971

[54] DEVICE FOR PIECE-BY-PIECE FEEDING OF BAR BLANKS
    2 Claims, 2 Drawing Figs.
[52] U.S. Cl. ......................................................... 83/417,
    83/411, 83/422, 83/425, 198/41, 221/212
[51] Int. Cl. ...................................................... B26d 7/06
[50] Field of Search ............................................. 83/417,
    422, 425, 411; 221/203, 212, 277; 198/41

[56] References Cited
    UNITED STATES PATENTS
| 1,641,222 | 9/1927 | Folsy | 83/411 X |
| 2,586,424 | 2/1952 | Gazette | 83/411 X |
| 3,238,825 | 3/1966 | Dearsley | 83/411 X |
| 3,253,491 | 5/1966 | Rakowicz et al. | 83/411 |
| 3,430,752 | 3/1969 | Spodig | 221/212 X |

Primary Examiner—Frank T. Yost
Attorney—Waters, Roditi, Schwartz & Nissen

ABSTRACT: The present invention relates to devices for piece-by-piece feeding of bar blanks. The device consists of a hopper for the blanks, a disc with a drive for its rotation, said disc having pockets for the blanks and provided with a clamp fitting around the disc and keeping the blanks in place during disc rotation, a device for shaking the blanks in the hopper, a blank cutter and at least one pair of magnets arranged so that their magnetic fields attract the blanks to the disc. The invention can be used most effectively for piece-by-piece feeding of bar blanks of a large length and small diameter with an insufficient stiffness, particularly bicycle wheel spokes.

DEVICE FOR PIECE-BY-PIECE FEEDING OF BAR BLANKS

The present invention relates to devices for piece-by-piece feeding of bar blanks. Most effectively this device is used for piece-by-piece feeding of very long and small diameter bar blanks possessing insufficient stiffness, for example, blanks of bicycle wheel spokes.

Known in the prior art is a device for piece-by-piece feeding of bar blanks which comprises a hopper for blanks, a disc with a drive for its rotation, said disc provided with pockets for the blanks and a clamp keeping the blanks in place during disc rotation, a device for shaking the blanks in the hopper, and a blank cutter. However, the known device actually cannot be used for piece-by-piece feeding of bar blanks of great length and small diameter, for example, bicycle wheel spokes, because, owing to their low stiffness, such blanks get entangled with one another and jammed in the gap between the disc and the hopper bottom.

An object of the present invention resides in eliminating the aforesaid disadvantage.

The main object of the invention is to provide an improved device for piece-by-piece feeding of bar blanks featuring a more perfect placing of the blanks into the disc pockets.

This object is accomplished by providing a device for piece-by-piece feeding of bar blanks, preferably bicycle wheel spokes, comprising a hopper for the blanks, a disc with a drive for its rotation, said disc having pockets for the blanks and a clamp holding said blanks in position during disc rotation, a device for shaking the blanks in the hopper and a blank cutter which, according to the invention, has at least one pair of magnets arranged on both sides of the disc so that their magnetic fields attract the blanks to the disc.

It is expedient that the magnets be arranged symmetrically with relation to the disc.

The device realized according to the present invention ensures reliable, without missing, feeding of insufficiently stiff blanks into the machine.

Figure 2:
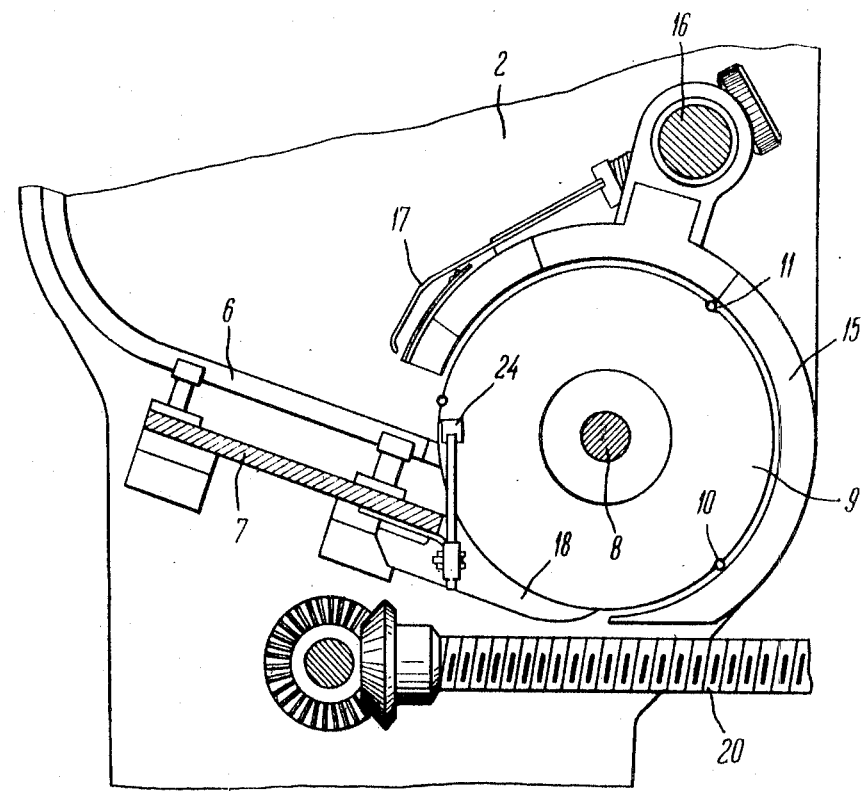

Now the invention will be described in detail by way of example with reference to the accompanying drawings, in which:

FIG. 1 is a general view of the device for piece-by-piece feeding of bar blanks;

FIG. 2—same, cross section.

The device for piece-by-piece feeding of bar blanks comprises a hopper 1 (FIG. 1) formed by stationary sidewalls 2 and 3, a movable thrust plate 4 which is displaced by means of three adjusting screws 5, and by inclined guide members 6 installed on a plate 7. The shaft 8 whose supports (not shown) are located in the stationary sidewalls 2 and 3, carries a disc 9 with pockets 10 for the blanks 11. The same shaft 8 mounts a device for shaking the blanks 11 which prevents the blanks from being entangled and consists of two discs 12 and 13 shaped like ratchet wheels. The shaft 8 is rotated by a drive (not shown) via gear wheels 14. The speed ratio of these wheels corresponds to the number of the pockets 10 of the disc 9. The disc 9 has a clamp 15 mounted on an axle 16 and holding the blanks against falling out of the pockets 10 of the rotating disc 9. The same axle 16 carries elements 17 (FIG. 2) which limit the number of the blanks 11 delivered from the hopper 1 to the disc 9.

The plate 7 (FIG. 1) is provided with a cutter 18 arranged above the auger screws 19 and 20 which are kinematically linked with the gear wheels 14 and rotated by the drive (not shown) of the machine which is supplied with the blanks 11 by the auger screws 19 and 20. Brackets 21 and 22 fastened to the plate 7 of the hopper 1 support two permanent magnets 23 and 24 arranged symmetrically on both sides of the disc. This arrangement of the magnets ensures uniform attraction of the blanks 11 to the disc 9 so that the blanks fall into the pockets 10 of the rotating disc.

The device functions as follows.

The movable thrust plate 4 is set by the adjusting screws 5 (FIG. 1) to a position corresponding to the size of the blanks 11 loaded into the hopper 1. Being started the drive of the machine receiving the blanks 11 puts in rotation the auger screws 19 and 20 and the shaft 8 with the discs 9, 12 and 13.

The blanks 11 loaded into the hopper 1 roll down over the inclined guide members 6 and plates 17 (FIG. 2), accumulate near the disc 9 and are constantly shaken by the discs 12 and 13 (FIG. 1). Entering the zone of the magnetic field generated by the permanent magnets 23 and 24, the blanks are attracted to the rotating disc 9. One of the blanks 11 is attracted by the magnets 23 and 24 to the disc 9 and, as the latter rotates, gets into the pocket 10 of the disc 9 and is carried towards the cutter 18 which pushes the blank from this pocket 10 onto the auger screws 19 and 20 which discharge the blanks 11 out of the device.

The device disclosed above comprises one pair of magnets but it may have two and more pairs to suit the length and stiffness of the blanks handled.

What I claim is:

1. A device for piece-by-piece feeding of bar blanks, preferably bicycle wheel spokes, comprising a hopper for blanks; a device for shaking said blanks in said hopper; a disc with pockets for said blanks; a drive for rotating said disc; at least one pair of magnets arranged on both sides of said disc so that their magnetic fields attract said blanks to said disc; a clamp fitting around said disc and holding said blanks in position during disc rotation; a cutter of said blanks.

2. A device according to claim 1 wherein the magnets are arranged symmetrically with relation to the disc.